(12) United States Patent
Tang et al.

(10) Patent No.: US 12,308,031 B2
(45) Date of Patent: *May 20, 2025

(54) PROGNOSTIC MAINTENANCE SYSTEM AND METHOD

(71) Applicant: Cybernet Systems Corp., Ann Arbor, MI (US)

(72) Inventors: Kevin Tang, Ann Arbor, MI (US); Charles Jacobus, Ann Arbor, MI (US); Charles Cohen, Ann Arbor, MI (US)

(73) Assignee: Cybernet Systems Corp., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,250

(22) Filed: Jun. 5, 2024

(65) Prior Publication Data

US 2024/0379108 A1 Nov. 14, 2024

Related U.S. Application Data

(63) Continuation of application No. 17/197,552, filed on Mar. 10, 2021, now Pat. No. 12,027,170.

(51) Int. Cl.
| | |
|---|---|
| *G10L 15/26* | (2006.01) |
| *G06N 20/20* | (2019.01) |
| *G10L 15/06* | (2013.01) |
| *G10L 15/16* | (2006.01) |

(52) U.S. Cl.
CPC .............. *G10L 15/26* (2013.01); *G06N 20/20* (2019.01); *G10L 15/063* (2013.01); *G10L 15/16* (2013.01)

(58) Field of Classification Search
CPC ....... G10L 15/26; G10L 15/063; G10L 15/16; G06N 20/20
See application file for complete search history.

(56) References Cited

U.S. PATENT DOCUMENTS

| | | | | |
|---|---|---|---|---|
| 2021/0118242 A1* | 4/2021 | Gautam | ................ | G07C 5/006 |
| 2021/0157302 A1* | 5/2021 | Brock | ................ | G05B 23/0283 |

* cited by examiner

*Primary Examiner* — Daniel C Washburn
*Assistant Examiner* — Athar N Pasha
(74) *Attorney, Agent, or Firm* — Fishman Stewart PLLC

(57) ABSTRACT

A system and method accepts data from direct fault and parameters measurements and historical data in formatted and unformatted form organized by device or system class, specific unit and unit subsystems, and by operation to learn how to predict or correct specified maintenance or other operations. Disclosed examples use known data and learned information historical data to correct or elaborate service requests based on specified and likely (based on learned information) needed maintenance operations. The system and method are applicable to any device requiring prognostic maintenance or other service based on service orders and direct measurement of operating parameters.

19 Claims, 10 Drawing Sheets

Figure 4

Data Partitioning
- Partition records at different work unit code levels
- Folders and files contain all records with the work unit code prefix

| C-130_Level3 | C-130_Level4 | C-130_Level5 |
|---|---|---|
| 11 | 11A | C-130_11A.txt |
| 12 | 11B | C-130_11AA.txt |
| 13 | 11C | C-130_11AB.txt |
| 14 | 11D | C-130_11AC.txt |
| 17 | 11E | C-130_11AD.txt |
| 21 | 11F | C-130_11BA.txt |
| 22 | 11G | C-130_11BB.txt |
| 24 | 11H | C-130_11BC.txt |
| 32 | 11J | C-130_11BD.txt |
| 41 | 11K | C-130_11CA.txt |
| 42 | 11L | C-130_11CB.txt |
| 44 | 11M | C-130_11CC.txt |
| 45 | 11N | C-130_11CE.txt |
| 46 | 11P | C-130_11DA.txt |
| 47 | 11Q | C-130_11DC.txt |
|  |  | C-130_11EA.txt |
|  |  | C-130_11EB.txt |

Figure 6

Generalization: Filter Set Expansion

- Generate filter variants using:
  - Permutations and combinations of Discrepancy and Corrective Narrative fields, keyword variations with leading/trailing spaces, parentheses, and more

| Level 5 Auto-filter | WUC BEGINS WITH "1241" AND DISCREPANCY CONTAINS ("2-MAN " OR "2 MAN " OR "2MAN ") AND DISCREPANCY DOES NOT CONTAIN ("ANTI " OR ("SCANNERTENT " OR "SCANNER TENT ") OR "TROOP " THEN CHANGE WUC TO 12415 |

Figure 7

Performance Metrics/Rating: Filter Quality Prediction

- Rate filters based on performance metrics including:
  - Test Quality %: (Records already matching change-to WUC to its level of indenture, plus number of correctable records) / (Total records returned by filter)
  - Change-To WUC %: Records filtered that already match the change to WUC to its level of indenture, divided by the Test Quality numerator which is composed of the correctable records plus those already matching change to WUC to its level of indenture
  - Average of Change-To WUC % and Test Quality %: Average of the change-to WUC % and the test quality %, to blend and balance each metric

| WUC BEGINS WITH "1221" AND DISCREPANCY CONTAINS "LADDER" THEN CHANGE WUC TO 1221G | Filter Quality Prediction: HIGH |
|---|---|

Records matched: 620
Records to change: 35
Test quality: 95.6% (593/620)
Average w/CTWP: 94.9%

| LEVEL 4 FILTER QUALITY | CONDITION TO QUALIFY |
|---|---|
| HIGH | (Test Quality Denominator >= 7) AND (Test Quality > 93) AND (Average of Change-To-WUC Percent and Test Quality > 67) |
| LOW | ((Test Quality Denominator < 7) AND (Test Quality > 81)) OR ((Test Quality Denominator >= 7) AND (Test Quality <= 93) AND (Test Quality >= 80) AND (Average of Change-To-WUC Percent and Test Quality > 87) AND (Test Quality Numerator <= 1208)) |
| REJECT | (All others) |

Execution Process

Figure 10
Related Applications
Medical:
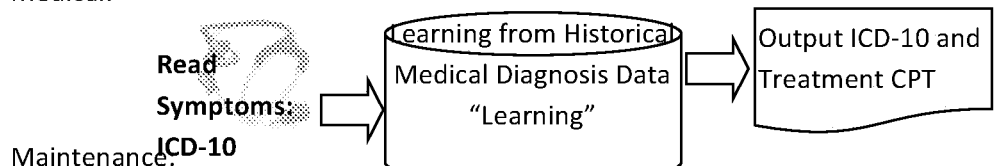
Maintenance:
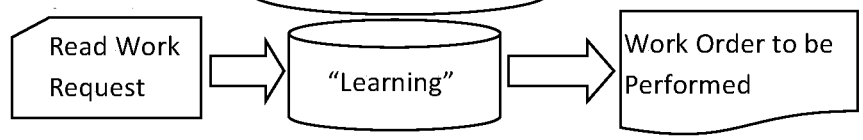
Diagnosis of Problems:
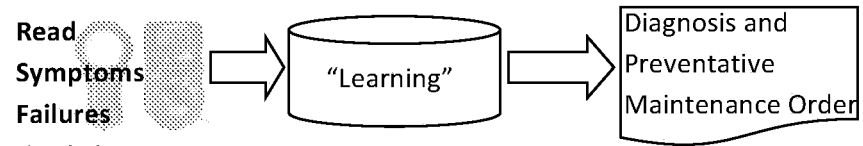
Distribution Logistics:
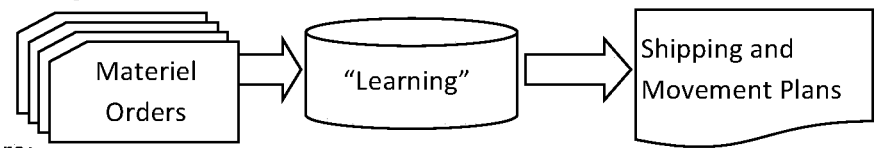
Agriculture:
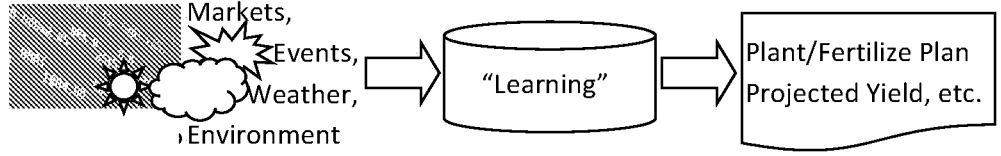
Manufacturing:
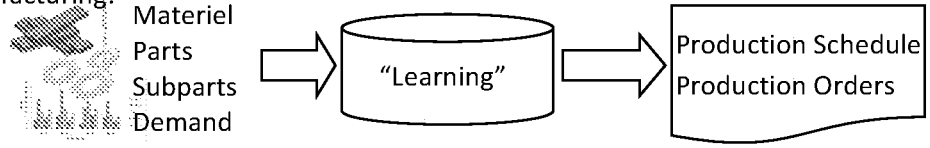
Hospitality:
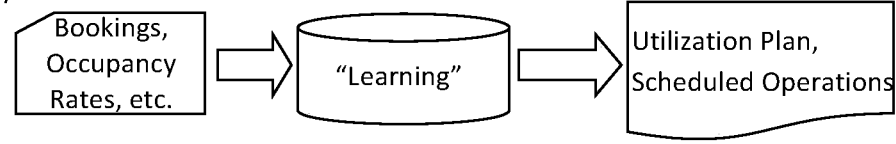
Strategy:
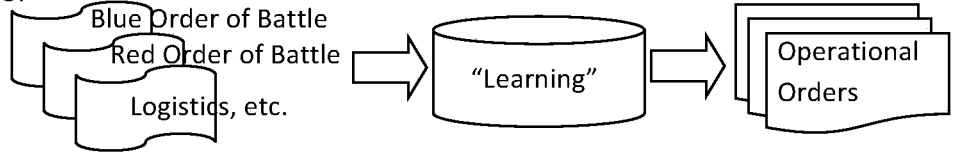
Transportation:
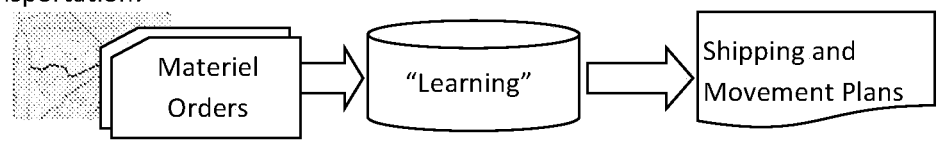
Power Plants:
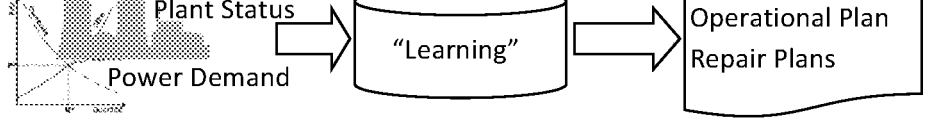

PROGNOSTIC MAINTENANCE SYSTEM AND METHOD

CROSS-REFERENCE TO RELATED APPLICATIONS

This application is a continuation application of U.S. application Ser. No. 17/197,552, filed on Mar. 10, 2021, the contents of which are hereby incorporated by reference in its entirety.

FIELD OF THE INVENTION

This invention relates generally to Artificial Intelligence, Natural Language parsing, Learning, Prediction and Prognostication based on machine learning and, in the field of maintenance, the invention pertains more specifically to Prognostic Maintenance.

BACKGROUND OF THE INVENTION

The idea of performing intelligent maintenance on devices, vehicle and aircraft has been of interest to industrial and military parties for at least since the 1980s, coinciding with a second burst of interest in Artificial Intelligence (AI) technology [Richardson 1984 and 1985]. In that time period, intelligent systems were being built with Expert System technology pioneered at Stanford University. One of the earliest interested parties was the US Air Force because of its growing need to maintain a fleet of complex technologically sophisticated aircraft platforms.

Since that time in the open literature, work has tracked waves of technical improvements in AI technology, including Dahal [1997] which reviews evolution of applied AI ideas to maintenance of power generators referencing work in simulated annealing, genetic algorithms, simulated evolution, neural networks, tabu search, fuzzy logic and their hybrid techniques. Yu [2003] describes a system that uses multiple agents and case-based reasoning to support maintenance decision making. Case-based approaches are a sophistication (elaboration of) of expert systems, while agent-based systems provide the possibility of parallel execution of the knowledge base.

Schwabacher [2007] provide another review of the technology from the mid 2000s, when a new rise of AI technology was beginning. Schwabacher focuses on prediction of needed maintenance or prognostics motivated by planned future NASA long duration space missions. Schwabacher suggests that the field can be divided into Physics-based (derived from a systems' operation physical principals and mathematics), Classical AI (as described in earlier references: Expert Systems, Finite State Machines, and Qualitative Reasoning), Conventional numerical methods (Linear regression, Kalman filters, etc.), and Machine learning-based (which were called "new" approach even though these ideas go back to early 1940s by McCulloch, Pitts, and Weiner; these techniques include Neural Nets, Decision Trees, Support Vector Machines, etc.).

Wu [2007] describes a predicative system based on Neural Nets of the era applied to diagnosis and prediction of pending failure for rotating machinery (i.e., in manufacturing). This system employs a standard network training approach that requires collection of measurement data from the rotating machine and validation data associated with that training data to feed an adaptive neural network (ANN) learning algorithm. The trained ANN then monitors similar data from the rotating machine and "decides" when maintenance is in order due to parameter evolution. Camci [2009] uses a different learning approach based on genetic algorithms. After reviewing some prior work in aircraft, ships, manufacturing systems, he defines a probabilistic framework that considers likelihood of failure, maintenance resources, and risk. Within that framework he defines a genetic algorithm approach that seeks to optimize operations within the framework, yield periodic maintenance schedules.

Kimotho [2013] describes pragmatic development of prognostics for industrial equipment. The Kimotho team developed an approach based on machine parametric data that employed an event-based decision tree to identify particular failure events, and then used a support vector machine to determine common problems within multiple events. The system required development of specific test case data (over 20,000 samples) to cover approximately 2500 failure event types, and was used evaluate over 3 million instances. This shows one of the weakness of most learning-based approaches—they require vast truth data collection to implement learning.

Finally, Abdallah [2018] describes a similar effort using decision trees and so called "big data." This team developed an operational and maintenance system for wind turbines. A decision tree fed by telemetry data from the turbine detects faults, damage, and abnormal operations. The "big data" is aggregated from the telemetry that sends from 48 wind turbines to a central current and historical data store. The work applies several decision tree algorithms create a bagged decision tree classifier leveraging cloud-based computation for learning (Apache Hadoop[1] and Spark[2]).

[1]The Apache Hadoop software library is a framework that allows for the distributed processing of large data sets across clusters of computers using simple programming models, https://hadoop.apache.org/.
[2]Apache Spark distribute computation environment achieves high performance for both batch and streaming data, using a state-of-the-art DAG scheduler, a query optimizer, and a physical execution engine, https://spark.apache.org/

In the patent literature, Wang et al. describe implementing a machine fault diagnosis system that employs a neural net-based fault diagnostic network approach. A hypothesis and test procedure based on fuzzy logic and physical modeling is embedded into the FDN to predict single and multiple fault conditions. Training data is generated through manual "trothing," initially through supervision of the fuzzy logic classifier applied upon acquired sensory signals. The execution phase uses the learned up FDN diagnostic module to identify faults in the sensory data stream and falls back on a physical machine model to identify faults not diagnosed by the FDN module.

Spira et al. in two patents describe a framework and tools for providing maintenance to complete plants or production lines. While broad and somewhat non-specific, generic, Spira does identify some important elements of such a maintenance systems including: a Computer architecture supporting maintenance services; accumulation of a historical data repository to identify needed maintenance related hardware, equipment, and software; Determination of specific maintenance processes; Identifying components; Analyzing failure modes; Developing technical and maintenance information—typically a manual; Expert Advice supported by a knowledgebase built from historical information; Remote monitoring; Benchmarking key performance indicators (which could be termed as ratings or metrics—terms not used by Spira et al.).

Yedatore et al. describes a method and system for automated corrective and predictive maintenance that associates maintenance with one or more tool failure events. The disclosed system describes a system that receives notification of failures, associates failure with corrective procedures, and then schedules maintenance events for the tool that has been predicted to fail. This patent does not deal deeply with how failures are detected of how the system would learn new failures (implying that detect and correct behaviors are manually determined and coded). The patent describes maintenance data but then describes this as containing pre-programmed corrective events. Prediction is multiply referenced in the system, but no description of how that is accomplished is described or claimed.

Eberhardt et al. in U.S. Pat. No. 9,349,103 and Published Application 2013/0198119 describes a system that employs a Bayesian belief network (BBN) model to perform estimation using known observed values associated with remaining features [faults] to generate a posterior probability for the corresponding feature [fault] being present. Based on a similarity score [metric] a fault is declared. The areas of application cited include Internet protocol characterization (i.e., packet filtering), complex manufacturing product variance detection, detection of biomarkers that might indicate subtle shifts in biology, and events generally in complex systems. Eberhardt notes that during the data set identification and curation, an appropriate training data set needs to be identified for use in training the BBNs. This dataset must possess sufficient statistical power (i.e., includes relevant good and bad cases from which the BNN learns), must be representative of the population in which the BBNs are to be applied, and must contain some subset of samples that have been "adjudicated," i.e., truth by an expert person. Curation separates this data into training sets and hold-out test sets (evaluation sets) for performance evaluation or scoring. Eberhart's disclosure describes at least one possible AI learning technique that could use to implement an intelligent fault identification subsystem.

Wolf et al. discloses methods and systems for providing corrective maintenance using global knowledge sharing. Wolf uses causes (e.g. symptoms, configuration, tests) to determine faults based on percentage [metric] matches to the causes. A corrective action is associated with each identified fault. The field of use cited is manufacturing machinery. Wolf discloses a database which includes data collected from manufacturing machines. The corrective maintenance system include logic to calculate the percentage matches (to causes) by performing the FAST factor query[3] on data in the database for determine for each fixable cause a number of factors that match the query. After ranking the highest probability determined they are resent to a maintainer for selection (which implies certain corrective actions). No technology to learn actions, rankings, matching, or causes (faults) is described, implying that this "configuration" data is manually developed and loaded into the system.

[3]Microsoft, FAST Query Language (FQL), https://docs.microsoft.com/en-us/sharepoint/dev/general-development/fast-query-language-fql-syntax-reference Cella et al. (i.e., 2020/02174464 and 2020/0012248) describe systems that employ the Internet of Things (IoT) to collect data from a distributed set of objects for various applications, principally in industrial control and maintenance. In 2020/02174464, Cella discloses industrial machine data analysis facility that generates streams of industrial machine health monitoring data by applying machine learning to data representative of conditions of portions of industrial machines received via a data collection network. The system disclosed may further include an industrial machine predictive maintenance facility that produces industrial machine service recommendations responsive to the health monitoring data by applying machine fault detection and classification algorithms.

The Cella disclosure discussed above suggests learning that is human-supervised or fully automated; uses one or more models, rules, semantic understandings, workflows, or other structured or semistructured understanding of the world; may operate where sufficient understanding of the underlying structure or behavior of a system is not known, and insufficient data is not available or where there is an absence of an underlying model; learning may be; and employing datasets that may include information collected using local data collection systems. The disclosure claims these methods to identify of variances in operating characteristics.

In 2020/0012248, Cella describes the IoT data collection approach in a less area of application specific manner, but still cites machines in and industrial environment. Because the disclosure focuses on distributed data collection and data store, it is rather non-specific concerning actual algorithms implementing learning, predictive or operational maintenance procedures, how historical data is collected and kept, etc.—i.e., the algorithmic meat of a prognostic or predictive system driven by data that may or may not be modeled or even completely correct (i.e., "truthed").

SUMMARY OF THE INVENTION

In broad and general terms, this invention improves upon prognostic maintenance by capturing historical maintenance information, and replacing or augmenting that information to make more optimal maintenance execution decisions based upon automated machine learning.

The preferred embodiment of the invention can be partitioned into two phases: the learning process and the execution process. The learning process is used to correct and predict likely maintenance activities or operations from existing stored maintenance records. Such records may include free form and fixed record format descriptions of the specified maintenance operations performed, diagnostic information that indicates the type of maintenance, and any direct measurements of faults that implicate some necessary maintenance. The execution process applies the results of the learning process to a specific set of maintenance requests or work orders for a given or specific device or system.

While an input to the system may be human-generated, in the preferred embodiments, fully automated techniques are used to optimize final maintenance recommendations. The processes may be executed on one or more computer platforms, independent of programming language and operating system, with specific hardware requirements being dependent upon the scope of a project (i.e., the amount and type of memory used to store received and generated databases, network interfaces for distributed computing, scanners and voice-recognition equipment to receive historical records, and so forth.

The invention improves the functioning of existing computer hardware and ancillary equipment while advancing numerous technologies and fields of endeavor distinct from computer automation in general. The most direct benefits come from perfecting device and system maintenance in general to produce work orders with a much higher degree of accuracy and relevance as compared to existing approaches. In contrast to expert systems, case-based reasoning systems and artificial neural networks, which rely upon human intervention, the instant invention does not require human involvement to assimilate or accumulate maintenance or planning knowledge bases, thereby improving generic computer functionality.

In contrast to existing systems, which demand input in the form of fixed or limited formats, the invention also accepts historical maintenance information in free-form or natural language, further improving the functioning of the computer hardware involved by accepting data derived directly from hand-coded work records in requests for service or in the historical data accumulated. Nor does the invention require detailed knowledge of the physics or the maintenance operational logic defining a particular set of maintenance operations, as this information is automatically derived directly from the accumulated historical records associated with a particular class of specific instance of a platform to be maintained.

The invention also improves upon technologies and fields of endeavor outside and apart from general-purpose computing, including aircraft, vehicle, ship, and other complex devices, systems or subsystem to determine the correct maintenance or operation to be performed. Indeed, the invention can be applied iteratively or recursively to any level of system partitioning, regardless of application area. The invention is not only applicable to isolated devices or systems, but is equally valuable to a fleet or class of vehicles/devices to determine overall fleet maintenance operations. For example, the invention may be applied to a specific device from the class or fleet to determine maintenance required by that specific vehicle or alternatively, to specific complex subsystems of the device or system such as the engine, transmission, electronic control, software, and so forth.

In accordance with the invention, the learning process includes the steps of receiving existing information associated with maintenance activities previously performed on one or more devices or systems (i.e., historical data), and performing one or more operations on the information as necessary or desired to generate formatted maintenance information for conducive to automated machine learning. One or more learning algorithms are applied to the maintenance information to predict or correct the way in which a maintenance operation should be performed on the same or similar devices or systems. Once the learning process has achieved a desired level of generalization or integrity, the execution process is used to receive a new maintenance request, filter the request for accuracy, and generate work orders with a high degree of confidence that the recommended maintenance or repair operations will be performed successfully.

Maintenance information input to the system may be sorted into groups that pertain to the same or similar devices or systems, and/or parsed into similar or related datasets with machine-standardized forms more conducive to the learning process(es) invoked. The learning algorithms use adaptive learning techniques or technology to associate and correct discrepancy narratives contained in the formatted maintenance information. The invention is not limited in terms of the algorithms used, which may include yet-to-be developed approaches or combinations of algorithms. In certain embodiments, an iterative or recursive rating system may be deployed to enhance the effectiveness of augmented data.

BRIEF DESCRIPTION OF THE DRAWINGS

FIG. 4 illustrates data partitioning;
FIG. 6 depicts filter set expansion;
FIG. 7 is directed to filter quality prediction;
FIG. 10 is a diagram that illustrates some of the different technologies and fields of application that are improved through the implementation and use of the invention.

DETAILED DESCRIPTION OF THE
PREFERRED EMBODIMENTS

Among other innovations, this invention captures the expertise of expert maintenance professionals, and replaces (or augments) that expertise with automated techniques. We found that experts have procedures that derive from their experience performing maintenance on systems in the past (i.e., analytical techniques for assimilating and using experience they had acquired from historical data). This data was to some extent directly measured from the platforms to be maintained, but most of it was in the form of past work orders that called for certain maintenance procedures based on original faults or causes. However, in the process of performing the maintenance, other operations were also performed to correct faults discovered along the way. This data was then been captured in the work orders performed and the records associated with that work.

Thus, our system derives from:
(a) keeping and organizing present and past work orders associated with platforms and work requests;
(b) implementing a parsing of that data into more machine standardized forms;
(c) learning algorithms to assimilate this historical data into working knowledge comparable to what the expert knows—but to make it reasonable to do, this knowledge assimilation or mining has to be capable of being performed without supervision (i.e., the data itself is used for learning, without human intervention); and
(d) employing this knowledge to new maintenance requests to correct them (even when some aspect of the submission is not correct), adding historical knowledge (i.e., elaborating the requests so that they more fully describe likely work to be performed), and coding the final resulting work order record to be more fully correct.

Our solution does not require human intervention to assimilate or accumulate maintenance or planning knowledge bases (i.e., like an expert system, case-based reasoning system, an ANN training system would).

Our solution accepts numerical, fixed format, and free-form or natural language data input most often derived directly from hand coded work records in requests for service or in the historical data accumulated.

Our solution does not require detailed knowledge of the physics or the maintenance operational logic defining a particular set of maintenance operations, as it derived this information directly from the accumulated historical records associated with a particular class of specific instance of a platform to be maintained.

The preferred input to the system is an organized maintenance record surrounding the maintenance activity and a reasonable history of this maintenance being performed from which maintenance knowledge can be derived and learned by the system.

Figure 1:
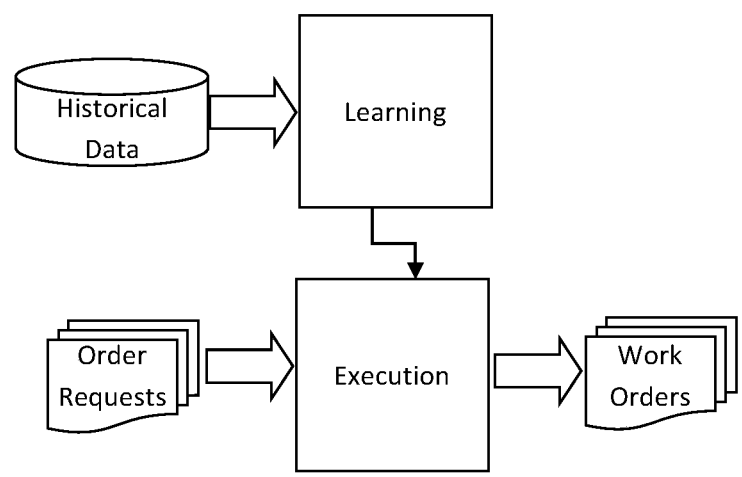
FIG. 1 is a highly simplified block diagram used to introduce the learning and execution phases of the invention.

The preferred embodiment of the invention can be partitioned into two phases (FIG. 1):

(1) The Learning Process: Learning of correct and likely maintenance activities or operations from existing stored maintenance records (which would include freeform and fixed record format descriptions of the specified maintenance operations performed, diagnostic information that indicates the type of maintenance, and any direct measurements of faults that implicate some necessary maintenance); and (2) The Execution Process: The Application of learning as applied to a specific set of maintenance requests or work orders for a given or specific device (i.e., aircraft, vehicle, ship, or other complex system or subsystem) to determine the correct maintenance or operation to be performed.

Figure 2:
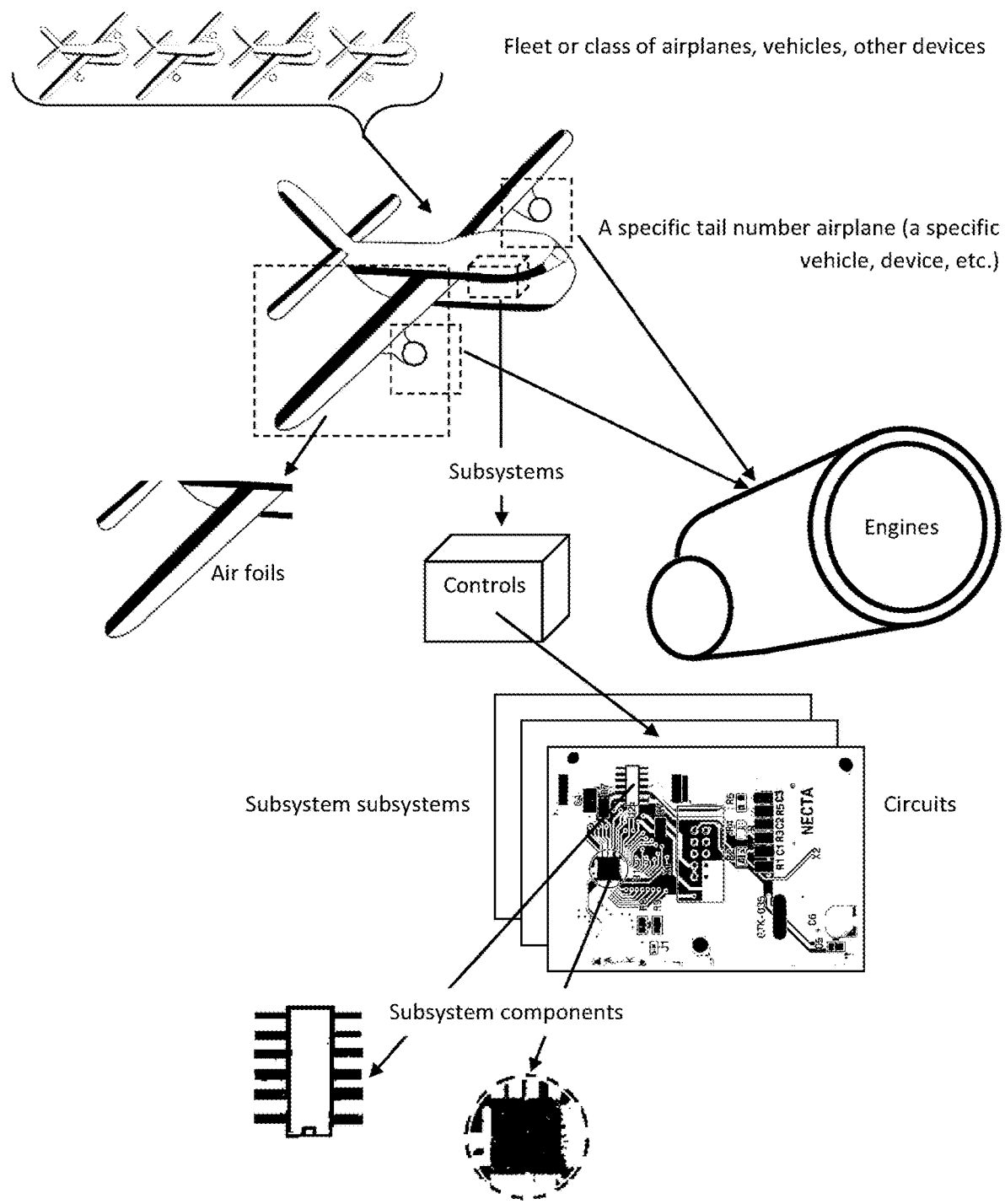
FIG. 2 illustrates the applicability of the invention to a range of devices and systems from individual components to fleets and classes of vehicles and other sophisticated groupings.

The system can be applied iteratively or recursively to any level of partitioning of a system (FIG. 2), so as an example, One might apply the processes to a fleet or class of vehicles/devices to determine overall fleet maintenance operations indicated;

One might apply it to a specific device from the class or fleet to determine maintenance required by that specific vehicle (which would include inducing the tests to be done, the work to be performed, the parts to be preordered for replacement or reworked, and any other aspect of the maintenance operations needed); or One might apply it to specific complex subsystems of the device (for instance the engine, transmission, electronic control, software, etc.).

The Learning Process

Figure 3:
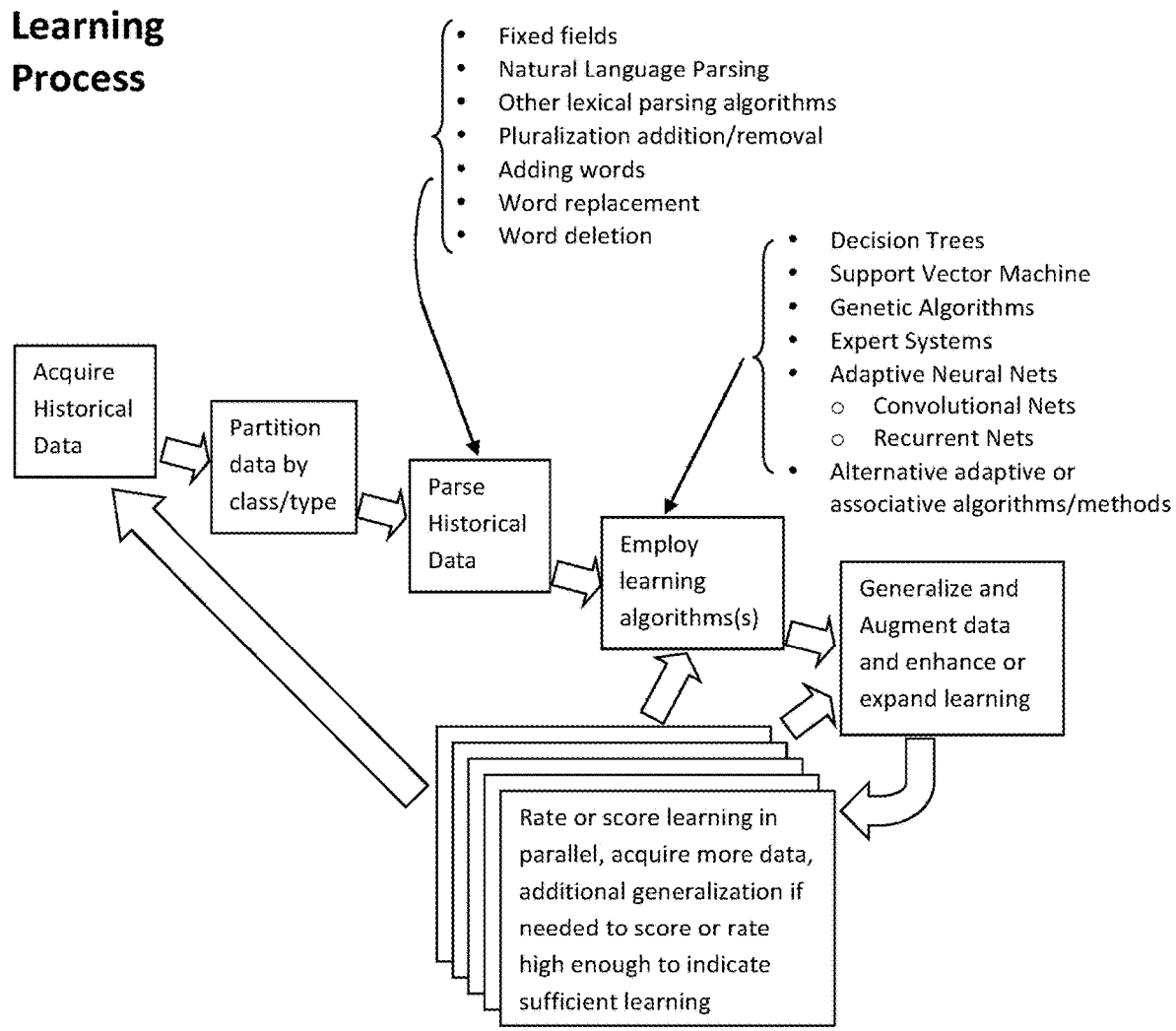
FIG. 3 is an overview of the learning process.

The learning process proceeds through 6 steps (FIG. 3):

(1) Historical data (or records) acceptance;
(2) Data partitioning (into similar or related datasets);
(3) Data parsing;
(4) Data induced learning of implicants (in our system these are called "Filters");
(5) Implicant generalization (in our system we call this "Filter Expansion"); and
(6) Implicant rating (or in our system "Filter Quality Prediction:").

These steps can be repeated multiple times as new historical data arrives or as improvements due to generalization occur (or if added learning approaches are tried and added in step (4) to improve ratings.

Historical data is typically derived from previous maintenance request record- and maintenance work order record pairings—i.e., maintenance records. Maintenance records provide the history of maintenance operations for an entire fleet of devices, their systems, and subsystems. Therefore, input data is sorted into groups that pertain to the same system or subsystem items (i.e., all the radio maintenance records together, engine maintenance records together, airframe maintenance records, together, C-130 records separated from F-15 records, etc.).

FIG. 4 shows sorting of C-130 aircraft work orders by work unit code prefix. Historical Data can be stored on paper, in computer records, in database systems, a collection directories and files (folders and files), or any form of data storage, and maybe accessible through networks or as standalone filing systems. Data items in the historical data may be prior reading or measurements (typically numerical), data source descriptions, text fields (fixed or variable sized), or some form of natural language (text forming words, phrases, sentences, etc. typed or captured by optical character recognition or verbally captured and converted by speech-to-text translation into similar text formats). The next step in processing, Data Parsing, seeks to convert this freeform of data into a fixed format that is more easily interpreted by a machine-based system.

Data Parsing (reformatting input historical data from input format and free format into fixed format records or essential data vectors) is performed on each partitioned set of data. The goal is to parsed each native or "in-the-wild" maintenance record into a standard maintenance record format which has a list of fields, names or attribute and corresponding field values (e.g., Field: "Fuel system", Value: "Low Flow", "Failed", "Over pressure", "Particulate contaminated", "Temperature>20° C.", etc.).

Many systems define fields as fixed location in the input record and some employ simple formats like tab delimited or comma delimited formats.[4] This reference summarizes a number of known parsing algorithms that used defined grammars to code information in language-like formats (like that used for programming or specification defining languages).[5] In a simple system this type of freeform parsing might be performed strictly by "keyword extraction." Keyword extraction might include:

[4]Tab-separated values, https://en.wikipedia.org/wiki/Tab-separated values, last edited May 6, 2020.
Comma-separated values, https://en.wikipedia.org/wiki/Comma-separated values, last edited May 31, 2020.
[5]Category: Parsing algorithms, https://en.wikipedia.org/wiki/Category: Parsing algorithms, Last edited Apr. 5, 2013.

Deleting special characters attached to a keyword

Deletion of repeated words

Deleting words smaller that a minimum keyword length (say 3 characters)

Checking that the keyword is not on delete list (for instance, one often deletes articles like "a" or "the")

Converting plural keywords to singular form

Adding keyword pairs as keywords (i.e., generating synonyms)

Some examples might be:

Records that contained "ARMRESTS" were tokenized as the singular "ARMREST"

Consecutive words like "ARM" and "REST" are paired to become "ARMREST" and included in keyword set Words like "KEYBOARD" might be augmented with "CONTROL PANEL" or "KEY PAD"

In the field of natural language or free-format parsing, many more sophisticated parsing approaches may be used, including without limitation:

1. Named Entity Recognition-identifies entities such as people, locations, organizations, dates, etc. from the text.
2. Sentiment Analysis—output of sentiment analysis is a 3-point scale: positive/negative/neutral or in more complex cases might be a numerical score.
3. Text Summarization—summarize a text based on a combination of extraction and abstraction. Extraction pulls keywords or entities from the text as a summary whereas abstraction generates fresh text from templates.[6][7]

[6]Lexrank—LexRank is an unsupervised approach to text summarization based on graph-based centrality scoring of sentences, https://pypi.org/project/lexrank/.
[7]Latent semantic analysis, modeling and simulation of the meaning of words and passages by analysis of representative corpora of natural text. http://www.scholarpedia.org/article/Latent_semantic_analysis.

4. Aspect mining—identify aspects of text such as part-of-speech tagging.[8] The idea is to extract and label words as to their purpose of part of speech in flow of natural text.

[8]Part-of-speech (or POS) tagging, https://en.wikipedia.org/wiki/Part-of-speech tagging—this summary includes a substantial list of open literature POS parsers. Last edited May 28, 2020.

5. Topic Modeling (or Topic Tracking)—Uses words extracted from a text to characterize that text. The words, organized into word vectors become an identification feature of the text and may be compared to word vectors from other texts to determine similarity. Sufficiently similar texts are grouped together and become a topic (through fusion of their respective word vectors into a topic vector).[9]

[9]Topic Model (Modeling), https://en.wikipedia.org/wiki/Topic model, includes a number of open literature topic modeling software packages. Last edited Apr. 13, 2020

In applying any of these techniques the goal is to take a mixture of fixed, and easily interpreted input fields, and complex fields of free form descriptive data and create a simple machine readable fixed format output vectors that is readily used in machine learning.

At least some of the historical data may be "pre-parsed", i.e., already will be in a fixed format record where certain data items are in certain record locations of fields. Also, some forms of historical data may be in a labeled text format like field name-value pairs (also called attribute-value pairs[10]) or in structured formats like XML which extends the name-value idea to support encoding of documents in a format that is both human-readable and machine-readable.[11]

[10]Attribute-value or Name-value pairs, https://en.wikipedia.org/wiki/Attribute %E2%80%93value_pair

Figure 5:
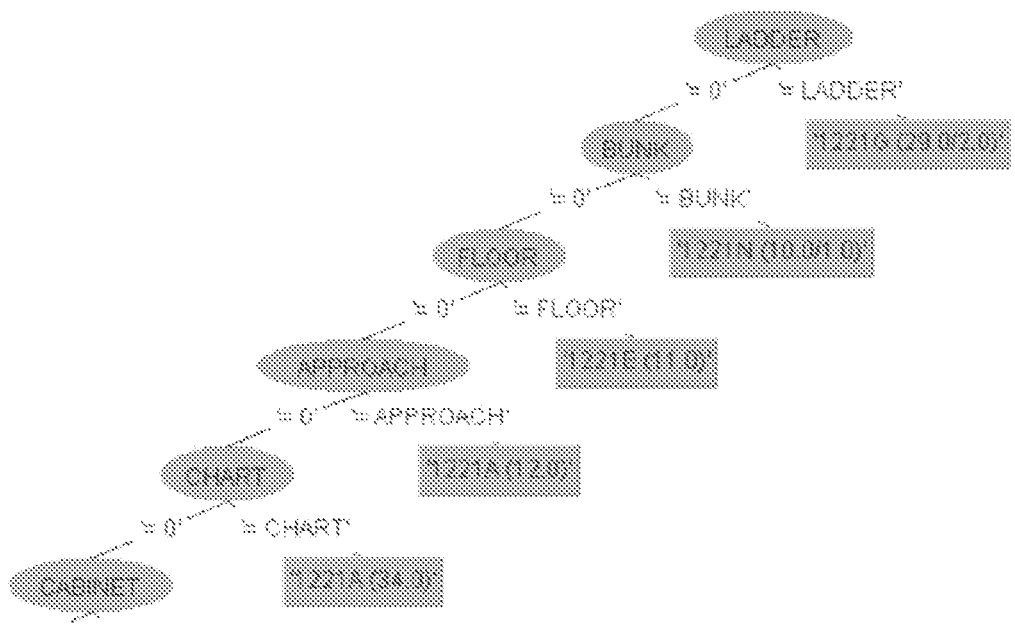
FIG. 5 is a diagram that shows learned decision trees.

[11]XML, describes XML format and provides an index to XML standards and XML similar codings, https://en.wikipedia.org/wiki/XML Data Learning comprises the use of an adaptive learning technique or technology to associate discrepancy narratives (fault diagnostic data records or vectors) to correct corrective narratives (i.e., description of the operations required to correct the discrepancy). In our preferred embodiment we generate a Decision Tree (FIG. 5) to associated discrepancy records with maintenance work order unit codes (or WUCs) and such an association is translated into a "Filter"—we call this Decision Tree Translation). Work order unit codes specify replacement material, tools, and maintenance operation required to correct a particular system, subsystem, or component. They could readily be replaced by any form of executable procedure with input items or conditions, and output results. Examples might include programmed procedures or algorithms, corrective or preventative maintenance steps such as in maintenance manuals, test procedures, checklists, etc.

Other applicable learning systems that can implement data induced learning or "Filtering" include:

Decision-trees: All legacy systems employ some form of feature detection[12] over input data records that effectively create subsets characterized by vector bundles. For decision tree learning[13] each feature vector (or word list for some systems) is compared to archetype features encoded into, typically, a binary tree. If an input vector is sufficiently close to an archetype, then the output associated with the node is the "recognition." If the tree is traversed to its base with no match then the recognition fails. In learning mode, the designated output would then be entered into the correct place in the binary tree and associated with the desired output. The difference between decision tree algorithms has to do with how the tree is coded, reordered, radii defining how close something has to be to match, and other related matters. Essentially the decision tree is means to implement a more efficient lease nearest neighbor matching approach. With a large enough tree and a small enough matching radius, a decision tree can be taught to recognize and distinguish between any number of items, but computation becomes less efficient for larger trees and generalization does not necessarily go hand in hand with simplification unless cases are taught in the right order.

[12]Tim Morris (2004). *Computer Vision and Image Processing*. Palgrave Macmillan; and https://en.wikipedia.org/wiki/Feature_detection_(computer-_vision)

[13]Quinlan, J. R., (1986). Induction of Decision Trees. Machine Learning 1:81-106, Kluwer Academic Publishers.

Support Vector Machine (SVM): Another learning implementation of least nearest neighbor associative memory (which connects input records or vectors to "recognitions") is the Support Vector Machine (SVM).[14] An SVM is given a set of input training examples, each marked as assigned to one or several output results. Then SVM training algorithm builds a model that assigns new examples either to an existing output (within an acceptance radius or closeness) or defines a new output, making it a non-probabilistic binary linear classifier. An SVM model is a representation of the learning examples as points in a space (could be numerical, or a space of keywords or phrases), mapped so that the examples of the separate categories are divided by a clear gap that is as wide as possible. New examples are then mapped into that same space and predicted to belong to an output based on which side of the gap they fall. Essentially this is another way of implementing nearest neighbor matching (where the matching archetypes are the support vectors). On a conventional computer this type of matching algorithm can be optimized through binary chopping of the error metric or other search optimizations, but gets more complex as the number of support vectors increase.

[14]Cortes, Corinna; Vapnik, Vladimir N. (1995). *"Support-vector networks"*. Machine Learning. 20 (3): 273-297.

Evolutionary/Genetic algorithms/Programming: A Genetic Algorithm (GA)[15] system is developed by coding archetypes (basically an input vector and an output vector) as a symbolic encoding and providing a metric of fitness that can applied to the archetypes to order them by fitness. At each stage of the GA, each archetype fitness is evaluated and then some percentage of the archetypes are eliminated and replaced with mutated versions of the remaining archetypes. The mutation can be randomly changed to the input vector or can be through crossovers mimicking sexual reproduction. Over time the GA explores a space relating inputs to outputs that optimizes the fitness of the remaining archetypes. The obvious issue with this approach is that we have to define the fitness metric, mutation means, and GA vector space (i.e., the set of archetypes) correctly towards producing a functionally correct set of products, and the process is slow and indirect. However, in problem spaces where one basically does know a better more direct approach, GAs can be useful. Genetic programs are basically GA where the symbol space is program fragments.

[15]Zhang, Jun; Zhan, Zhi-hui; Lin, Ying; Chen, Ni; Gong, Yue-jiao; Zhong, Jing-hui; Chung, Henry S. H.; Li, Yun; Shi, Yu-hui (2011). "Evolutionary Computation Meets Machine Learning: A Survey" (PDF). Computational Intelligence Magazine. IEEE. 6 (4): 68-75

Expert systems—Rule-based learning: Expert Systems[16] are programming or knowledge based constructed where statements are constructed to evaluate a "What if?" function usually based on variable or data extracted from a common black-board of data (which will include both input data and data stored or learned from prior inputs), and if the "What if?" computes to true, execute a consequential program or algorithm that will have some effect in the world or within the black-board. Then learning becomes including additional expert rules or "What if?": action execution pairs as well as saved data in the black board from prior executions.

An expert system is an efficient way to program certain types of logical inference engines, but as the rule sets get longer, computation performance declines and the complexity of understanding all the interactions between rules and blackboard data becomes more difficult. Furthermore, while it is possible to build system that learns within this framework from input data, it requires a means beforehand made or automatic coding of new rules.

[16]Buchanam B, Duda, R, Principles of Rule-Based Expert Systems, Advances in Computers, Vol. 22, 1983, pp. 163-216.

Adaptive Networks, Artificial Neural Networks, Deep Learning Networks: An artificial neural network (ANN)[17] learning algorithm, usually called "neural network" (NN), is a learning algorithm that is inspired by the structure and functional aspects of biological neural networks. Computations are structured in terms of an interconnected group of artificial neurons, processing information using a connectionist approach to computation. Modern neural networks employ non-linear statistical data modeling or learning. They are usually used to model complex relationships between inputs and outputs, to find patterns in data, or to capture the statistical structure in an unknown joint probability distribution between observed variables.

[17]https://en.wikipedia.org/wiki/Artificial_neural_network and McCulloch, Warren; Walter Pitts (1943). "*A Logical Calculus of Ideas Immanent in Nervous Activity*". Bulletin of Mathematical Biophysics. 5 (4): 115-133; Rosenblatt, F. (1958). "*The Perceptron: A Probabilistic Model for Information Storage And Organization In The Brain*". Psychological Review. 65 (6): 386-408.
Dreyfus, Stuart E. (1990-09-01). "*Artificial neural networks, back propagation, and the Kelley-Bryson gradient procedure*". Journal of Guidance, Control, and Dynamics. 13 (5): 926-928.
Hertz, J.; Palmer, Richard G.; Krogh, Anders S. (1991). *Introduction to the theory of neural computation*. Addison-Wesley.

Convolutional Networks or ConvNets are a kind of ANN that have been used for finding varied applications including image recognition applied to image query,[18] object labeling,[19] autonomous driving,[20] speech recognition,[21] segmentation of biological images,[22] optical character recognition,[23] and face recognition,[24] all basically data labeling applications. Many of these systems employ networks of 10 to 20 layers deep, essentially equivalent to data normalization, dewarping, feature data extraction, data segmentation, and object labeling. These large networks tend to require application of computation engines to achieve acceptable performance such as the NVIDIA GPU.[25] Implementation of algorithms to be GPU compliant has become much easier since standard image processing libraries like OpenGL are available in GPU ports so that algorithms develop in conventional ways can virtually automatically GPU accelerated.

[18]Simonyan, K. & Zisserman, A. Very deep convolutional networks for large-scale image recognition. In Proc. International Conference on Learning Representations http://arxiv.org/abs/1409.1556 (2014).
[19]Krizhevsky, A., Sutskever, I. & Hinton, G. ImageNet classification with deep convolutional neural networks. In Proc. Advances in Neural Information Processing Systems 25 1090-1098 (2012).
[20]Hadsell, R. et al. Learning long-range vision for autonomous off-road driving. J. Field Robot. 26, 120-144 (2009).
[21]Waibel, A., Hanazawa, T., Hinton, G. E., Shikano, K. & Lang, K. Phoneme recognition using time-delay neural networks. IEEE Trans. Acoustics Speech Signal Process. 37, 328-339 (1989).
[22]Ning, F. et al. Toward automatic phenotyping of developing embryos from videos. IEEE Trans. Image Process. 14, 1360-1371 (2005).
[23]Simard, D., Steinkraus, P. Y. & Platt, J. C. Best practices for convolutional neural networks. In Proc. Document Analysis and Recognition 958-963 (2003).
[24]Lawrence, S., Giles, C. L., Tsoi, A. C. & Back, A. D. Face recognition: a convolutional neural-network approach. IEEE Trans. Neural Networks 8, 98-113 (1997).
[25]NVIDIA cuDNN, GPU Accelerated Deep Learning, https://developer.nvidia.com/cudnn Recurrent neural networks (or RNNs)[26] have been applied or tasks that involve sequential inputs, such as text parsing, speech and language interpretation.[27] RNNs process an input sequence one element at a time, maintaining in their hidden units a 'state vector' that implicitly contains information about the history of all the past elements of the sequence. When we consider the outputs of the hidden units at different discrete time steps as if they were the outputs of different neurons in a deep multilayer network, it becomes clear how we can apply back-propagation to train RNNs.

[26]Hochreiter, S. & Schmidhuber, J. Long short-term memory. Neural Comput. 9, 1735-1780 (1997).
[27]ElHihi, S. & Bengio, Y. Hierarchical recurrent neural networks for long-term dependencies. In Proc. Advances in Neural Information Processing Systems 8 http://papers.nips.cc/paper/1102-hierarchical-recurrent-neural-networks-for-long-term-dependencies (1995).

RNNs have been found to be very good at predicting the next character in the text[28] or the next word in a sequence, but they can also be used for more complex tasks. For example, after reading an English sentence one word at a time, an English 'encoder' network can be trained so that the final state vector of its hidden units is a good representation of the thought expressed by the sentence. This thought vector can then be used as the initial hidden state of (or as extra input to) a jointly trained other language 'decoder' network, which outputs a probability distribution for the first word in that language translation. If a particular first word is chosen from this distribution and provided as input to the decoder network it will then output a probability distribution for the second word of the translation and so on until a full stop is chosen. Overall, this process generates sequences of translated words according to a probability distribution that depends on the English sentence. This rather naive way of performing machine translation or free-form text parsing has quickly become competitive with the state-of-the-art.[29]

[28]Sutskever, I., Martens, J. & Hinton, G. E. Generating text with recurrent neural networks. In Proc. 28th International Conference on Machine Learning 1017-1024 (2011).
[29]Lakoff, G. & Johnson, M. Metaphors We Live By (Univ. Chicago Press, 2008).

Generalization of the learning (in our system we call this "Filter Expansion"; see FIG. 6): Augmenting the learning dataset. Any of the above learning methodologies basically know what they have been taught—i.e., based on the data that they have been shown during learning. Using any of these or other associative memory implementations, the idea is to read through a dataset of prior maintenance records and create a set of rules, filters, or networks that can read the input data from a particular maintenance request and generate a corrected and more complete version of it to control the repair and maintenance execution to actually be done. Thus the idea is to use prior learned knowledge to "predict" the maintenance that will have to be performed so that the correct material, operational steps, and personnel will be on hand when the complex system arrives at the repair depot.

Generalization comprises the use of the natural linguistic descriptions of work code units (specific sets of records that associate work specified with work to be performed), to create additional variations of the input data. Sometimes in the AI literature this is called building an augmented truth data set. For instance, one can generate permutations and combinations of the discrepancy (the way a work order is coded in a in a request vs. the work performed) and the corrective narrative (i.e., the work that is performed vs. the work order requested), addition or removal of non-descriptive items like spaces, parentheses, or non-informational words, and reordering of work order or worked performed descriptions. These permutations, which describing equivalent associations, generate additional learning or truth data to augment that which is already captured in Historical Data. Applying this Augmented Historical Data to the learning process creates more generalized learning, thus an expanded "Filter Set" associating work orders requested with the correct work to be performed.

As an example, a Level 5 filter that states:
 WUC BEGINS WITH "1241" AND DISCREPANCY CONTAINS "2-MAN" AND DISCREPANCY DOES NOT CONTAIN "ANTI" OR "SCANNERTENT" OR "TROOP" THEN CHANGE WUC TO 12415

Might alternatively be generalized to:
 WUC BEGINS WITH "1241" AND DISCREPANCY CONTAINS ("2-MAN" OR "2 MAN" OR "2MAN") AND DISCREPANCY DOES NOT CONTAIN "ANTI" OR ("SCANNERTENT" OR "SCANNER TENT") OR "TROOP" THEN CHANGE WUC TO 12415

Performance Metric Measurement: Rating (or in our system "Filter Quality Prediction:")

When generalizing decision filters generated through learning, it is necessary to define performance metrics that control the learning process (i.e., when is a new set of simplified or complexified decision rules better than the ones they replaced or augmented?) In this embodiment, metrics may include:
 Test Quality %: (Records already matching change-to WUC to its level of indenture, plus number of correctable records)/(Total records returned by filter)
 Change—To WUC %: Records filtered that already match the change to WUC to its level of indenture, divided by the Test Quality numerator which is composed of the correctable records plus those already matching change to WUC to its level of indenture
 Average of Change-To WUC % and Test Quality %: Average of the change-to WUC % and the test quality %, to blend and balance each metric A new filter has a high quality of prediction when a combination of these metrics shows a high and improved prediction percentage over the system of filters without the generalization from the new filter. This process is summarized for the preferred embodiment in FIG. 7.

The independent design of individual filters allows for massively parallel filter evaluation and scoring. This enables practical speedup of the filter generation process that will scale with the number of processing cores. This design approach allows the learning process to explore and mass produce a huge variety of targeted filters that enhance filtering coverage and accuracy.

The Execution Process

Figure 8:
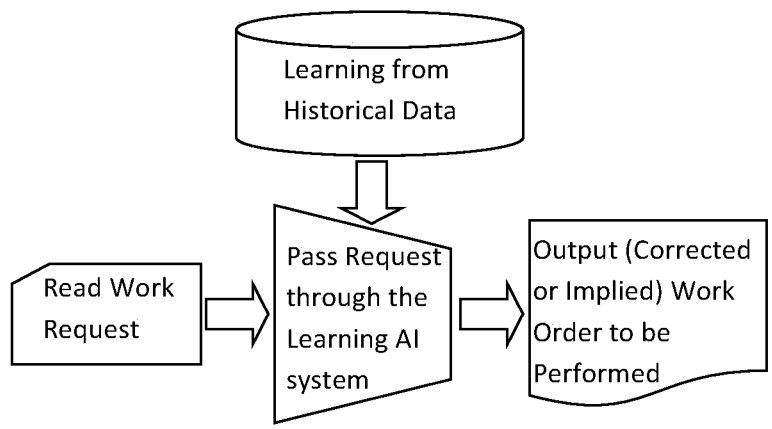
FIG. 8 is an overview of the execution process.

Once predictive maintenance has learned over the Historical Data and the Augmented Historical data (i.e., learned and then generalized), it is applied to incoming work order requests to output work order units to be performed. Essentially the execution phase takes descriptions of what is wrong, has been wrong, or might be wrong with a unit or device to be maintained and generates the corrected work order unit(s) necessary to effect device repair back to fully operational status (FIG. 8). Thus, the Execution Process uses the captured learning from prior operations on this specific device and other devices of similar type or class and descriptions of likely work to be necessary to repair this device to generate or predict necessary device maintenance operations.

Figure 9:
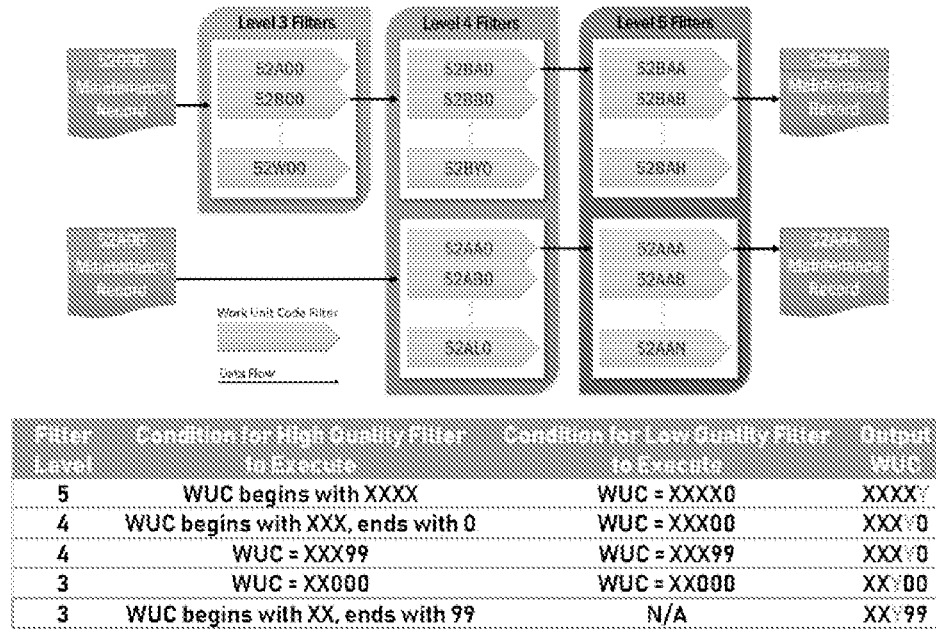
FIG. 9 illustrates filter execution.

In our invention this takes the form of "Filtering" input work order requests through the filters that are designed to correct request errors, and to insert any necessary corrections to augment the specific repair requests to effect the complete device repair to operation service level. In other systems, the output could be used to generate proposed maintenance reports that describe of elaborate repair needed to be performed (which is basically what indexed by and work order unit code number or WUC), error diagnostic reports describing faults to be corrected, or built or rebuild operations (FIG. 9). In similar systems applied to other applications the input request data and the resulting recommend correct operation data can take other forms. Examples include (FIG. 10):

In Medical the request code may be an ICD code (presenting ICD-10) that describes a disease, sign or symptom, complaints, social circumstances, or external causes of injury or disease. The output work order unit code might be a CPT code (presently CPT 2020 from the AMA which is a code that describes medical, surgical, and diagnostic procedures and services performed by hospitals, physicians, health insurance companies and accreditation organizations to remedy injury, disease, or other related medical conditions and to document the remedy for billing and reporting purposes).

In Maintenance of Systems the request code may be specific and historically recorded preliminary work order requests and the output may be a correct work orders to perform the maintenance (and document it for recording and billing).

For Diagnosis of Systems the request may be a periodic historical record of system performance or service and the output might be predicted preventative maintenance to be performed for each performance period or due to a specific set of symptoms.

In a Distribution or Logistical System the request may a set of conditions historically monitored in the environment (for instance the demand for certain items at retail, web-site, or distribution centers) and the output might be likely shipping and reorder processes that are necessary to maintain or replenish supplies and distribute them to points of consumption.

In Agriculture the request may be a set of measured and historical environmental factors like rain fall, soil measurement parameters, light inputs, etc. and the output might be a likely yield, fertilizing operational plan, and a target harvest date.

In Manufacturing the request data might be historical supply chain parameters and the output might be production targets. Basically our system becomes the AI predictive or "smart" component of an ERP system (ERP is Enterprise Resource Planning).

In Hospitality the request might be historical facilities utilization rates and specific currently made bookings, and the output might be a likely target occupancy rates and the plan to execute against them.

In War Strategy the inputs might be measurements of the current battle state and history of recorded past battles (or simulation of battles captured to a historical database), and the output might be proposed tactical information (logistical requirements, troop strengths and locations, armaments allocations, etc.)

In transportation, as in Distribution or Logistical systems may shipment and route information historically monitored and the output might be likely shipping and transportation routes and capacity requirements.

In Maintenance and Operation of Power Distribution Systems inputs might be historical power demand measurements and plant status measurements, and outputs might be operation data, planned plant refurbishment or repair cycles, and plans for adding new capacity.

The invention claimed is:

1. An improved maintenance method, comprising the steps of:
    receiving a maintenance request associated with a target device or system;
    filtering the maintenance request by applying one or more learning algorithms to the maintenance request to correct the manner in which a maintenance operation should be performed on the target device or system;
    generating a filtered maintenance request in response to applying the one or more learning algorithms to the maintenance request; and
    performing a corrected maintenance operation on the target device or system using the filtered maintenance request.

2. The improved maintenance method of claim 1, wherein applying one or more learning algorithms includes using captured learning from prior operations on at least one of (i) the target device or system and (ii) one or more similar devices or systems to generate the filtered maintenance request.

3. The improved maintenance method of claim 2, wherein applying one or more learning algorithms includes using descriptions of likely work to be necessary to repair the target device or system to generate the filtered maintenance request.

4. The improved maintenance method of claim 3, wherein applying one or more learning algorithms includes predicting necessary maintenance operations for the target device or system.

5. The improved maintenance method of claim 1, wherein filtering the maintenance request includes correcting errors in the maintenance request.

6. The improved maintenance method of claim 1, wherein filtering the maintenance request includes inserting necessary corrections to augment the maintenance request to repair the target device or system to operation service level.

7. The improved maintenance method of claim 1, further comprising:
    generating proposed maintenance reports describing repair to be performed on the target device or system.

8. The improved maintenance method of claim 1, further comprising:
    generating error diagnostic reports describing faults to be corrected of the target device or system.

9. The improved maintenance method of claim 1, further comprising:
    generating proposed rebuild operations of the target device or system.

10. The improved maintenance method of claim 1, wherein the maintenance request is an International Classification of Diseases (ICD) code; and the filtered maintenance request is a Current Procedural Terminology (CPT) code.

11. The improved maintenance method of claim 1, wherein the maintenance request is a historically recorded preliminary work order request; and the filtered maintenance request is a corrected work order request to perform the maintenance on the target device or system.

12. The improved maintenance method of claim 1, wherein the maintenance request is a periodic historical record of performance or service of the target device or system; and the filtered maintenance request is a predicted preventative maintenance to be performed due to a set of symptoms.

13. The improved maintenance method of claim 1, wherein the maintenance request is a set of conditions historically monitored in an environment; and the filtered maintenance request is one or more likely shipping and reorder processes that are necessary to maintain or replenish supplies.

14. The improved maintenance method of claim 1, wherein the maintenance request is a set of measured and historical environmental factors; and the filtered maintenance request is at least one of (i) a likely yield, (ii) a fertilizing operational plan, and (iii) a target harvest date.

15. The improved maintenance method of claim 1, wherein the maintenance request is at least one historical supply chain parameter and the filtered maintenance request is a production target.

16. The improved maintenance method of claim 1, wherein the maintenance request is at least one of (i) a historical facility utilization rate and (ii) currently made bookings; and the filtered maintenance request is a likely target occupancy rate and associated execution plan.

17. The improved maintenance method of claim 1, wherein the maintenance request is at least one of (i) one or more measurements of a current battle state and (ii) a history of recorded past battles; and the filtered maintenance request is proposed tactical information.

18. The improved maintenance method of claim 1, wherein the maintenance request is historical information of at least one of shipment and route; and the filtered maintenance request is at least one of likely shipping routes and capacity requirements.

19. The improved maintenance method of claim 1, wherein the maintenance request is at least one of (i) historical power demand measurements and (ii) plant status measurements; and the filtered maintenance request is at least one of (i) operational data, (ii) planed plant refurbishment or repair cycles, and (iii) one or more plans for adding new capacity.

* * * * *